United States Patent [19]

Bankes et al.

[11] 4,340,323

[45] Jul. 20, 1982

[54] DECELERATING AND REORIENTING ELONGATED MAGNETIC ARTICLES

[75] Inventors: Kristen E. Bankes, Reading; Donald M. Large, Temple; Fred J. Reinhard, Whitfield Reading, all of Pa.

[73] Assignee: Western Electric Co., Inc., New York, N.Y.

[21] Appl. No.: 202,285

[22] Filed: Oct. 30, 1980

[51] Int. Cl.³ .............................................. B65G 11/20
[52] U.S. Cl. ..................................... 406/83; 193/32; 198/381; 198/534
[58] Field of Search ....................... 198/381, 534, 619; 193/32, 40; 406/83; 209/904, 907

[56] References Cited

U.S. PATENT DOCUMENTS

| | | | |
|---|---|---|---|
| 3,217,461 | 11/1965 | Wheelock | 406/443 X |
| 3,774,782 | 11/1973 | Lewis, Jr. | |
| 3,782,517 | 1/1974 | Newcomb | 221/172 X |
| 4,209,959 | 7/1980 | Bachman et al. | 198/381 X |

FOREIGN PATENT DOCUMENTS 1259791 1/1968 Fed. Rep. of Germany ........ 406/83

*Primary Examiner*—Robert B. Reeves
*Assistant Examiner*—Paul A. Sobel
*Attorney, Agent, or Firm*—D. C. Watson

[57] ABSTRACT

An axially leaded diode (12), travelling at a high rate of speed in a longitudinal direction, is terminated within a bin assembly (18). The bin (18) has first and second ends (43 and 44) and first and second sidewalls (21 and 22) including magnets (33–41) therein to orient a diode (12) transversely to such sidewalls. A tube (48) guides the diode (12) on a path forming a given angle "A" with the sidewalls (21 and 22). A discharge end (49) of tube (48) is located at the first sidewall (21) such that the diode (12) is discharged toward the second sidewall (22). A deceleration apparatus (54) is provided at discharge end (49) of tube (48) and spaced therefrom. Apparatus (54) includes a vertical bar (65) with a row of deceleration elements (66) extending therefrom toward the first end (43) of the bin (18). The row of elements (66) provides a penetrable restraint (64) such that a first lead (14) of a diode (12) discharged from tube (48) penetrates between the elements (66). The body (16) of the diode (12) impinges upon and is slidably restrained along the elements (66). As the diode (12) advances out of the elements (66) said diode is rotated to an orientation transverse of bin (18).

17 Claims, 2 Drawing Figures

DECELERATING AND REORIENTING ELONGATED MAGNETIC ARTICLES

TECHNICAL FIELD

This invention relates to decelerating and reorienting elongated magnetic articles. More particularly the invention relates to decelerating and reorienting articles such as axially leaded devices which are moving in a longitudinal direction.

BACKGROUND OF THE INVENTION

In the production of elongated magnetic articles, such as axially leaded diodes, it is beneficial to mechanically convey such articles within a given operation or from one operation to another. Conventionally an elongated article is conveyed in one of two principal modes which are characterized by the orientation of the article with respect to a path in which it is travelling. If such article is oriented with its elongate dimension parallel to the path, it is said to be travelling longitudinally. If the article is oriented with its elongate dimension perpendicular to the path, it is said to be travelling laterally. Each mode of conveying has its separate characteristics and is selected accordingly for a particular application.

In the process treatment of axially leaded diodes within a given operation, it is typically advantageous to convey such diodes in a lateral manner. For example, in a paint drying operation, a chain conveyor moves the diodes laterally in a spaced, parallel relationship through a lengthy oven. For testing and taping diodes, they are typically disposed in a similar manner on the peripheral surface of a wheel. To feed diodes onto such wheels, they are typically suspended in a magnetic bin which maintains the orientation and advances the diodes in a lateral manner.

It is a characteristic of lateral conveying that each article can be treated on an individual and successive basis with the articles loaded to a high density along the path of travel. It is a further characteristic that conveying speeds are slow to permit individual treatment and to maintain the lateral orientation. A problem is that moving articles laterally requires equipment which is expensive, which consumes considerable space, and which is not easily changed with regard to article speed or direction. Because of the slow speed of article travel, however, there is a minimum of wear on equipment or damage to an article, even when the movement of an article is terminated.

Both lateral and longitudinal modes of travel have been used for conveying articles from one operation to another. However, until recent years, it is believed that there has been little mechanical conveying of devices between operations in the electronic industry using either mode of travel. For example, a batch of axially leaded devices, typically has been run through a lead straightener and captured in a container. The container has then been manually carried and emptied into an orienting apparatus such as a magnetic bin which fed the diodes onto a testing wheel. Consequently, in the integration of electronic operations, there appears to be a long felt need for inter-operational conveying without the problems associated with lateral conveying.

In a longitudinal mode of conveying elongated articles, troughs and tubes are often used to support and guide the articles with the motive power typically supplied by the force of gravity or a stream of air. Troughs appear to be used primarily for conveying over short distances or where in-transit treatment is desired, within a given operation. It will be appreciated that tubing offers little such in-transit treatment of articles enclosed therewithin. It will also be appreciated that utilization of the force of gravity is limited by available differences in equipment elevation in a production line.

Fortunately, air-powered tubes are typically quite inexpensive, they consume little space, and are accommodating to changes in speed and direction of article travel. However, if articles are to be delivered for individual and successive treatment, low air pressure is typically used, producing only moderate speeds and low density loading. The problem is that high speeds typically produce almost intolerable terminating conditions. For example, an axially leaded diode has a pair of wire-like leads extending from a generally central, body portion. Such leads are quite susceptible to being bent in the course of terminating a diode travelling longitudinally at high speeds.

Despite the termination problem, high speed, longitudinal conveying of diodes is desirable for special applications. These applications include long distance conveying between operations and short distance recycling of diodes within an operation. For example, in a polarity testing operation, it is desirable to capture a diode of reversed polarity at the output and to return the diode in a reoriented manner to the input of the testing apparatus.

In the long or the short distance applications, it is desirable that a longitudinally oriented diode, travelling at high speeds be decelerated, reoriented, and fed into a lateral conveying apparatus without damage to the article or excessive wear on equipment.

SUMMARY OF THE INVENTION

In view of the foregoing, it is an object of this invention to provide new and improved apparatus and methods for decelerating and reorienting elongated magnetic articles. Another object is to decelerate and reorient an elongated article moving in a longitudinal direction.

With these and other objects in mind, the present invention includes apparatus for decelerating and reorienting an elongated magnetic article which has an enlarged, generally central, body portion and which is moving in a longitudinal direction. A bin assembly is provided having first and second ends and first and second sidewalls, including magnets to orient the article transversely of the sidewalls. A tube guides the article in a longitudinal direction on a path forming a given angle with the sidewalls of the bin measured with respect to the first end. A discharge end of the tube is disposed at the first sidewall such that the article is discharged therefrom toward the second sidewall. Deceleration apparatus is provided at the discharge end of the tube and spaced therefrom, including a vertical bar with a row of deceleration elements extending therefrom toward the first end of the bin. The row of elements forms a penetrable restraint such that a first portion of an article discharged from the tube penetrates between the elements and the body is slidably restrained therealong. As the article advances out of the elements, said article is rotated by the attraction of the magnets to an orientation transversely of the bin.

In another embodiment, the given angle formed between the path of the article and the sidewalls is greater than ninety degrees. An air connection to the tube is provided to direct a stream of air into the tube to propel the article therewithin. The air is discharged with the article thereby further propelling the article off the deceleration elements and along the bin toward the first end. In a particular embodiment, said deceleration elements are canted toward the second sidewall to facilitate release of the article.

In a method of decelerating and reorienting such an article, at least one article is held within a similar bin assembly. The moving article is guided along a similar path and is discharged into the bin from the first sidewall toward the second sidewall. The moving article is decelerated as it enters the bin with means including a vertical bar having a row of spaced, deceleration elements extending therefrom toward the first end of the bin forming a penetrable restraint. A first portion of the moving article, discharged into the bin, penetrates between the elements. The body of the article is slidably restrained as the article advances out of the elements and further into the bin and said article is rotated magnetically to an orientation transversely of the bin.

BRIEF DESCRIPTION OF THE DRAWINGS

The above-described and other objects, advantages, and features of the invention will be more readily understood from the following detailed description when read in conjunction with the accompanying drawing, wherein.

Figure 1:
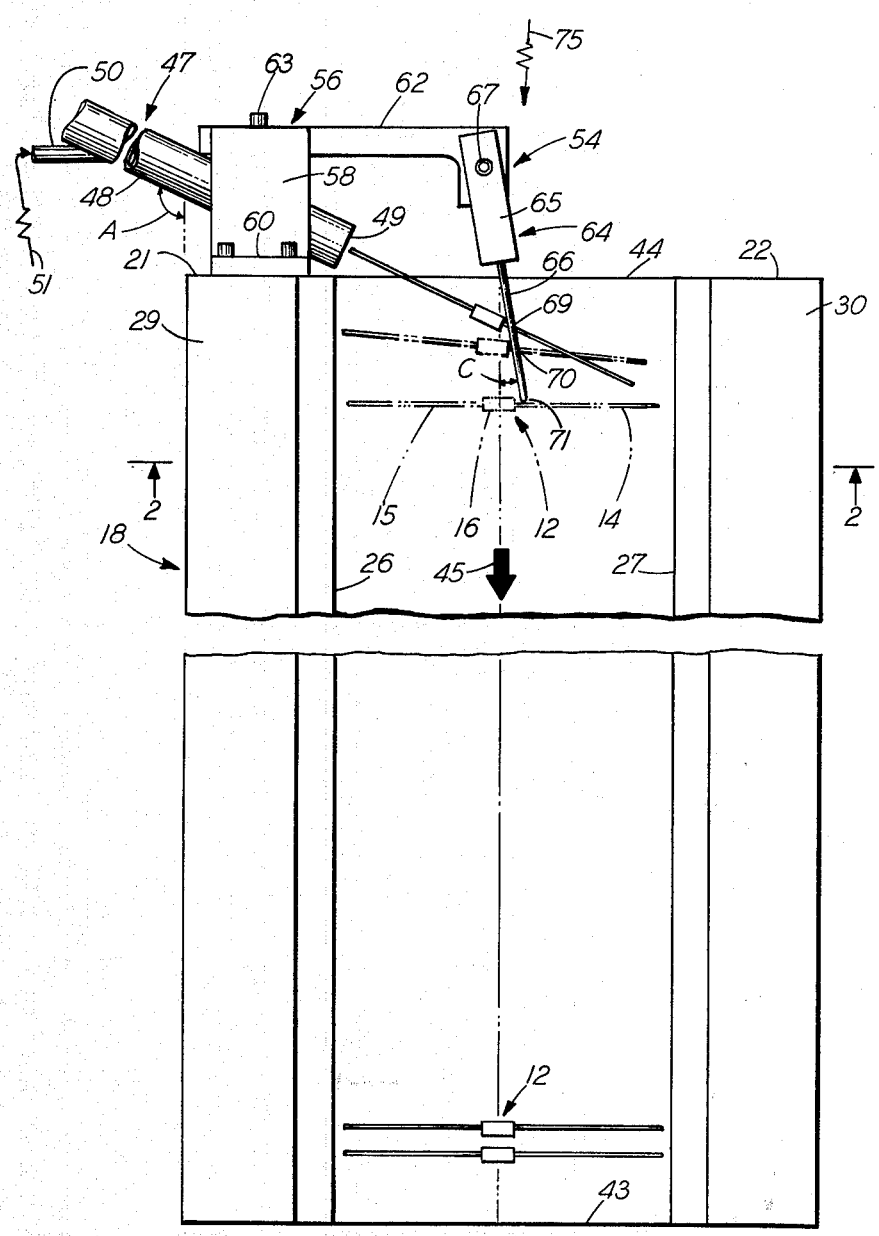
FIG. 1 is a foreshortened plan view of a magnetic bin, a delivery tube, and a decelerating apparatus in accordance with the instant invention.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

The Elongated Magnetic Articles

Figure 2:
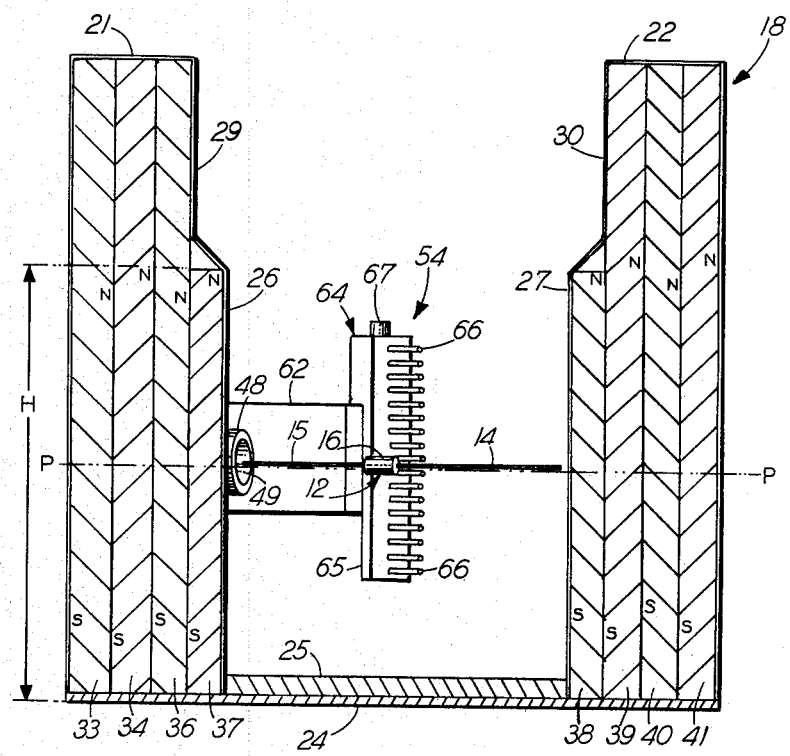
FIG. 2 is a cross-sectional view of the apparatus shown in FIG. 1, taken along line 2—2.

In each of FIGS. 1 and 2 there is shown at least one elongated magnetic article 12 which is decelerated and reoriented in the practice of this invention. For purposes of illustration, the articles 12 will often be identified and referred to as axially leaded diodes 12. However, it will be appreciated that other elongated magnetic articles 12 can as well be handled in the practice of the invention.

Referring again to FIG. 2, the diode 12 is seen to have wire-like leads 14 and 15 extending in opposite directions, typically in a collinear manner, from a generally central body portion 16. In an illustrative example, which will be used hereinafter unless otherwise specified, a typical diode 12 is assumed to be about 3.375 inches long and weigh about 0.243 grams. Each lead 14 or 15 is about 0.020 inches in diameter and about 1.563 inches long. The body 16 is cylindrical in shape, being about 0.120 inches in diameter and about 0.250 inches long.

The body 16 contains an electronic device (not shown) which has a cathode connected to one external lead such as lead 14 and, in this example, an anode connected to the other external lead 15. The diode 12 is thus directionally sensitive from a polarity standpoint although such polarity typically cannot be discerned by visual observation of the shape of the diode 12.

The leads 14 and 15 and certain parts of diode 12 within the body 16 are made of a magnetic material; i.e., a material which is attracted to a magnet. Therefore, diodes 12 are affected by magnetic forces and magnetic apparatus is advantageously used to manipulate such diodes.

The Bin Assembly

There is shown in FIG. 1 a foreshortened plan view of a magnetic bin assembly designated generally by the numeral 18. There is also shown in FIG. 2 a cross-sectional view of bin 18 taken along line 2—2. Referring usually to both figures hereinafter, it can be seen that bin 18 includes an upright, generally horizontally extending, first sidewall 21 and a similar, second sidewall 22, joined in a spaced parallel relationship by a floor member 24 which is overlaid by a liner plate 25. The sidewalls 21 and 22 have confronting inside faces 26 and 27, respectively, typically spaced apart a distance slightly greater than the length of a diode 12 measured between the outer tips of leads 14 and 15. For example, given the illustrative diode 12 having an overall length of 3.375 inches, the distance between faces 26 and 27 may be set at 3.438 inches. This setting provides suitable fabrication tolerances for both the diodes 12 and the bin 18.

It will be incidentally seen that sidewalls 21 and 22 further include narrow top portions 29 and 30, respectively, which are provided to receive a tray (not shown), filled with diodes 12. The unseen tray and the method by which diodes 12 are manually released from the tray into bin 18 are described in an article entitled "Moving Articles Through Descending Magnetic Fields," Western Electric, technical digest, No. 57, January 1980, Page 1. The described method of releasing diodes 12 into bin 18 is part of a manual method of handling diodes whereas the instant invention is directed, inter alia, toward minimizing such manual handling of such articles 12. It can be seen that there are also extensions of magnets in top sidewalls 29 and 30 which are believed to have some influence on a lower magnetic field, but have little influence on the operation of the invention. Therefore, the top portions 29 and 30 will be virtually disregarded hereinafter. For purposes of illustration, the operative portion of bin 18 will be considered to be the lower portion thereof having a heighth "H," as shown in FIG. 2.

It is further seen in FIG. 2, that first sidewall 21 includes vertically disposed, flat bar magnets 33-37 which extend for substantially the full length of bin 18. In a similar manner sidewall 22 includes similar magnets 38-41, also extending for substantially the same length as those in sidewall 21. Note that magnets 33-41 are designed such that each face thereof is of a uniformly north or south polarity. Flat bar magnets about 0.38 inches thick are commercially available and the desired strength of a magnetic field can be obtained by mating such magnets together to obtain a composite magnet of about 1.50 inch thickness in each of the sidewalls 21 and 22.

In an illustrative example, wherein the illustrative diode 12 has the properties indicated above and the distance between faces 26 and 27 is set at 3.438 inches as indicated, the net air gap between the composite magnets is about 3.56 inches. For these conditions, a molded plastic, substantially permanent, magnet material is selected such as that sold by 3M Company of Minneapolis, Minnesota under the trade designation "Plastiform PL-1 or PL-1H." Magnets of such material are arranged as shown to achieve a desired level of substantially uniformly distributed residual magnetism over each sidewall 21 and 22. Furthermore, the field established between and transverse to sidewalls 21 and 22 is of sufficient strength relative to the weight and material of the illustrative diode 12 to orient and suspend the diode between faces 26 and 27 suitably to practice the invention.

The general features of a magnetic bin such as bin 18 and the principles by which articles 12 are oriented, suspended, and advanced therewithin are adequately described elsewhere. For example, such a description is found in copending patent application Ser. No. 65,031, filed Aug. 9, 1979, now U.S. Pat. No. 4,262,805, which is assigned to the assignee of the instant application and is hereby incorporated herein by reference. In the cited application an arrangement of magnets is described, which is similar to the arrangement just described for the instant invention. The application discloses that a plane of balanced magnetic forces, designated generally in the cited application and the instant application as plane P—P, is established by such an arrangement of magnets. Such plane P—P extends longitudinally of a bin and intersects the sidewalls at about the midpoint of their heighth. Articles, such as diodes 12, are found to seek plane P—P, becoming suspended therealong with an orientation transverse to the sidewalls. Moreover, the magnetic forces are of substantially uniform magnitude along the plane so when a bin is inclined, the articles 12 advance along plane P—P under the force of gravity.

Embodiments of the above principles for receiving diodes 12 and for feeding a taping operation are shown in copending patent application Ser. No. 172,730 filed Aug. 28, 1980, which is also assigned to the assignee of this application and is hereby incorporated herein by reference. As seen therein, one embodiment of a loading bin includes four magnets disposed in each of two sidewalls. Consequently, each sidewall includes a composite magnet having a distance between poles of about 1.500 inches. The magnetic field thus created is found to adequately orient and suspend diodes, such as the diodes 12 described in the instant application. In such a magnetic field and in the similar field established in bin 18 there is established a plane P—P of balanced magnetic forces. Plane P—P, as shown in FIG. 2, is slightly above the midpoint of heighth "H" due to the influence of the extensions of magnets 33–41 alluded to earlier.

Referring to FIG. 1, it can be seen that bin 18 has an outlet end 43 and an inlet end 44 and that between such ends there is space to accumulate a multitude of diodes 12, all oriented laterally of the path of travel shown by arrow 45. However, the flux lines crossing bin 18 tend to congregate in the magnetic material of individual articles such as diodes 12 causing each diode to be temporarily magnetized along its length. At any given point along the length of a diode 12, it is of the same polarity as an adjacent diode. Consequently, when the diodes 12 are suspended within bin 18, they tend to repel one another and resist being urged into a dense pattern. It is, therefore, desirable to provide a force to urge the diodes toward outlet end 43 where they can be held until picked up by a carrier. Such force can be supplied by utilizing the force of gravity, so bin 18 is often pitched forward from inlet end 44 to outlet end 43 as will be explained later.

The Guiding Arrangement

At the inlet end 44 of bin 18, there can be seen a tube arrangement designated generally by the numeral 47 for guiding a longitudinally moving article such as a diode 12. A tube 48 is selected of a proper material and having a proper diameter to achieve guidance over the available route for moving the article. For example, a diode 12 is guided by a 0.375 inches I.D. tube made of a polyethylene material which is hard enough to resist abrasion but which is relatively flexible. For recycling diodes 12 within a given operation it is typically desirable to route the tubing around or between equipment in very limited spaces. Given the diode 12 described hereinbefore and a 0.375 inches I.D. tube, a radius of about 2 feet can be achieved in making turns without kinking the tubing or jamming a diode 12 therewithin.

The tube 48 is so disposed at the approach to bin 18 so the moving diode 12 is guided on a path forming a given path angle "A" with the sidewalls measured with respect to the outlet end 43. Angle "A" is set according to the weight and speed of the article and the termination conditions within bin 18. It is here sufficient to state that angle "A" will typically vary from about 90 degrees to about 135 degrees depending upon many factors as will be explained later.

An air nozzle 50 is shown entering the wall of tube 48 at an unspecified location. Nozzle 50 is connected to a source of compressed air (not shown) to advantageously move diodes 12 through tube 48 over a typically elevated route at a desired speed and over a given distance. Consequently, the pressure required will vary but is typically easily ascertainable after the tubing 48 is installed. In a recycling application, it is typical to locate nozzle 50 near the inlet of articles to tube 48 and at an acute angle measured with respect to the inlet end (not shown). In that manner, a slight vacuum is created at the inlet to assist entry of a diode 12. Upon entry into tube 48, a diode 12 becomes engulfed by an air stream 51 therefrom and is propelled within tube 48 to a discharge end 49 of tube 48 at the first sidewall 21 of bin 18. The approach portion of tube 48 and the discharge end 49 are arranged so a diode 12 is discharged from the first sidewall 21 toward the second sidewall 22 of bin 18 as shown in the figures.

There is also shown at the inlet end 44 of bin 18, a deceleration assembly designated generally by the numeral 54. Assembly 54 includes a support member designated generally by the numeral 56 having a bracket 58 fixedly attached to the first sidewall 21 by a flange 60. Bracket 58 is further adapted, in the illustrated example, to support one or more tubes 48 and to further support an arm 62 which is fastened to bracket 58 by a machine screw 63. There is a slot (not shown) in arm 62 through which screw 63 is inserted to adjustably move arm 62 laterally of bin 18.

Located near the centerline of bin 18, there is found a penetrable restraint designated generally by the numeral 64 which is part of the deceleration assembly 54. Restraint 64 is further disposed at the discharge end 49 of tube 48 and spaced therefrom a distance set according to the length of article 12 to be decelerated as will be later explained. Restraint 64 further includes a vertical bar 65 which is pivotally mounted to arm 62 by a pin 67. Bar 65 has a row of elongated deceleration elements 66 extending therefrom toward the outlet end of bin 18. Said elements 66 are preferably formed of a non-magnetic material, free of sharp edges such that a body slidably restrained along the elements is not damaged therealong. For a diode 12 having the characteristics hereinbefore described, stainless steel elements are selected having a circular cross-section, each being about 0.064 inches in diameter. They are about 1.75 inches long and are spaced about 0.125 inches on centers along the row. Elements 66 are shown canted away from a line parallel to the sidewalls by an angle "C" measured with respect to the outlet end of the bin 18. Angle "C" is set according to the speed of the article, the orientation strength of the magnetic field, and the deceleration conditions on the elements, as will be explained later.

Operation

The operation of the invention will be described with respect to the diode 12, the bin assembly 18, the tube arrangement 47, and the deceleration assembly 54 just set forth as illustrative examples. The air pressure into nozzle 50 is set to deliver a diode 12 along and within tube 48 with a speed of from about 7 to about 10 feet per second. The path of the diode 12 is set to form an angle "A" of from about 95 to about 105 degrees with sidewall 21 measured with respect to the outlet end of bin 18. The path is also disposed parallel to and slightly above the plane P—P of balanced forces in the magnetic field of bin 18, at least until the diode 12 is discharged into bin 18. The bin 18 is pitched from the inlet end 44 to the outlet end 43 at an angle taken with respect to a horizontal plane of from about 10 to about 14 degrees. The restraint 64 is canted away from a line parallel to the sidewalls 21 and 22 measured from the outlet end 43 of bin 18 of from about 8 to about 12 degrees. Under these conditions, a diode 12 is discharged from the end 49 of tube 48 and a lead 14 of such diode penetrates between the elements 66 until the body 16 impinges upon elements 66 at about a theoretical point 69 along the elements 66. The diode 12 is propelled along the elements 66 by its own inertia and further by the stream of air 51 leaving tube 48. Since the bin 18 and the elements 66 are pitched in the same manner, the diode 12 is also slidably advanced by the force of gravity along elements 66.

Point 69 is purposely set further away from face 27 of sidewall 22 than the length of lead 14 plus normal clearances to allow for flexing of elements 66. As the diode 12 advances to another theoretical point 67 on elements 66, the magnetic field rotates diode 12 close to a lateral orientation. Consequently, the cant angle "C" provides adequate clearance at face 26 of sidewall 21 to permit such rotation. As the diode 12 is advanced to another theoretical point 71, it has completely been reoriented and it has separated laterally from the elements 66. The diode 12 thereafter advances forward of bin 18, by the force of gravity or the air stream 51 from tube 48, along and close to the plane P—P in the magnetic field.

Alternate Embodiments

It will be appreciated that the ranges of settings set forth above are considered preferable for the illustrative diode 12. However, one or more settings could be individually changed while using one or more of the given ranges of settings if assisting apparatus were employed. Moreover, other settings could as well be used if one could tolerate moderate wear on an article 12 or on equipment.

For example, if it is inconvenient to pitch bin 18 and elements 66 to further propel a diode 12 off elements 66, the bin could be set level from end 44 to end 43. Then at least one stream of air from a typical jet 75 could be directed upon elements 66 to propel the article 12. If the lead portions 14 and 15 of an article 12 are very thick or a body 16 will not tolerate normal impingement forces, a brush having a vertical bar with at least one row of resilient bristles extending therefrom could be used for a restraint 64.

If it is not convenient to guide an article 12 along a path slightly above plane P—P or if two tubes 48 are employed, one or more ends 49 could discharge articles 12 at other elevations. However, a bias of such articles toward plane P—P is to be expected by the attraction of the magnetic field which bias is increased or decreased by the force of gravity as it works on the article 12. Therefore, the elements 66 should be turned upward or downward to accommodate for the bias to prevent a first portion of an article 12 from binding as it rotates in the elements.

In the illustrative example, a 0.375 inch diameter tube was selected to permit relatively short radius turns along the path travelled by the diode 12. However, the body of the illustrative diode 12 is only 0.120 inches in diameter. Consequently, the diode 12 is not always discharged into restraint 64 such that it penetrates between the same elements 66. If more accurate guidance is desired, a funnel could be installed somewhere in tube 48 to decrease the bore of the tubing at the discharge end. However, it will be appreciated that such a decrease in the bore should not be considered where diodes are fed into the tube in a rapid, non-successive manner so that overlapping can be expected.

It is further believed to be within the spirit of the invention to vary path angle "A" and cant angle "C" outside the ranges set in the illustrative example. If more speed is desired for advancing article 12 along bin 18, path angle "A" could be set at a more obtuse value providing the magnetic field is strong enough to rotate the article 12. In such a case arm 62 could be laterally adjusted toward the second sidewall and restraint 64 could be pivoted toward the discharge end 49 of tube 48 to provide a more direct restraint of an article 12. Of course cant angle "C" would change accordingly when restraint 64 is pivoted.

It is further believed that the path angle could be set at more acute angles than the range given. Then a plurality of air jets 75 could be used to propel the article 12 off the elements 66. In such a case, the cant angle "C" could be set to zero to provide a more direct restraint for a moving article 12. It is believed that the last two examples illustrate that cant angle "C" is varied to obtain proper restraint and, therefore, proper deceleration of a moving article 12. Such deceleration should be accomplished with a minimum of lateral bouncing of an article 12 between the two sidewalls. Consequently, cant angle "C" is set larger or smaller as the speed of an article 12 is increased or decreased. Also the speed of an article 12 is set according to the strength of the magnetic field and its ability to reorient a given article 12.

There have been illustrated herein certain embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for decelerating and reorienting an elongated magnetic article having an enlarged, generally central, body portion, which article is moving in a longitudinal direction, comprising:

a bin assembly for holding at least one such article, having first and second ends and first and second sidewalls including magnetic means to orient the article transversely of the sidewalls;

means for guiding the moving article in a longitudinal direction on a path forming a given angle with the first sidewall of the bin, a discharge end of such guiding means being disposed at the first sidewall such that the moving article is discharged therefrom toward the second sidewall; and deceleration means spaced from the discharge end of the guiding means, including a vertical bar with a row of deceleration elements extending therefrom toward the first end of the bin, said row of elements forming a penetrable restraint such that a first portion of the moving article discharged from the guiding means penetrates between the elements and the body is slidably restrained therealong as the article advances out of the elements and further into the bin, said article being rotated by the magnetic means to an orientation transversely of the bin.

2. Apparatus as in claim 1, wherein the bin is level between the ends, further comprising:

means for directing at least one stream of air upon the deceleration elements further to propel the article off the elements and along the bin toward the first end.

3. Apparatus as in claim 1, wherein the bin is pitched downward from the second end to the first end and the deceleration elements are pitched in the same manner such that the article is slidably advanced off the elements toward the first end of the bin by at least the force of gravity.

4. Apparatus as in claim 1, wherein the given angle formed between the path of the article and the sidewalls measured with respect to the first end of the bin is made greater than ninety degrees and wherein the guiding means include at least one tube, further comprising:

means for directing a stream of air into the tube to propel the article therewithin such that the stream of air is discharged with the article, thereby further propelling the article off the deceleration elements and along the bin toward the first end.

5. Apparatus as in claim 1, wherein the deceleration elements are canted away from a line parallel to the sidewalls at an angle measured with respect to the first end of the bin such that the article separates at least partially laterally off the elements as such article advances in the bin.

6. Apparatus as in claim 1, wherein the magnetic means are substantially uniformly distributed over each sidewall, said means establishing a magnetic field of sufficient strength relative to the weight and material of the article to orient and suspend the article between the sidewalls at a position relative to a plane of balanced magnetic forces within the bin and wherein the article is guided along a path parallel to and slightly above the plane of balanced forces until it is discharged into the bin.

7. Apparatus as in claim 1, wherein the deceleration means include a brush having a vertical bar with at least one row of resilient bristles extending therefrom toward the first end of the bin.

8. Apparatus as in claim 1, wherein the deceleration elements are formed of a non-magnetic material, free of sharp edges such that a body slidably restrained along the elements is not damaged therealong.

9. Apparatus as in claim 1 or 4, wherein the articles are axially leaded diodes propelled along the path at from 7 to 10 ft./sec., the given path angle is from 95 to 105 degrees, the pitch of the bin is from 10 to 14 degrees, and the cant angle is from 8 to 12 degrees.

10. A method of decelerating and reorienting an elongated magnetic article having an enlarged, generally central, body portion, which article is moving in a longitudinal direction comprising:

holding at least one such article within a bin assembly having first and second ends and first and second sidewalls including magnetically orienting the article transversely of the sidewalls;

guiding a moving article in a longitudinal direction on a path forming a given angle with the sidewalls of the bin measured with respect to the first end such that the article is discharged into the bin from the first sidewall toward the second sidewall; and decelerating the moving article as it enters the bin with a row of deceleration elements extending from a vertical bar toward the first end of the bin, a first portion of the article penetrating between the elements and the body being slidably restrained therealong as the article advances out of the elements and further into the bin, said article being rotated magnetically, to an orientation transversely of the bin.

11. A method as in claim 10, wherein the bin is level between the ends, further comprising:

directing at least one stream of air upon the deceleration elements to further propel the article off the elements and along the bin toward the first end.

12. A method as in claim 10, wherein holding the article further comprises:

pitching the bin and the deceleration elements downward in the same manner such that the article is slidably advanced off the elements toward the first end of the bin by at least the force of gravity.

13. A method as in claim 10, wherein the given angle formed between the path of the article and the sidewalls measured with respect to the first end is formed greater than ninety degrees, the guiding step further comprising:

guiding the article within a tube; and directing a stream of air upon the article within the tube to propel the article therewithin such that the stream of air is discharged with the article, thereby further propelling the article off the deceleration elements and along the bin toward the first end.

14. A method as in claim 10, wherein the decelerating step further comprises:

canting the deceleration elements away from a line parallel to the sidewalls at an angle measured with respect to the first end of the bin such that the article separates at least partially laterally off the elements as such article advances in the bin.

15. A method as in claim 10, wherein magnetically orienting the article further comprises:

establishing a substantially uniformly distributed magnetic field between the sidewalls of the bin, of sufficient strength relative to the weight and material of the articles to orient and suspend the articles between the sidewalls at a position relative to a plane of balanced magnetic forces within the bin; and guiding the moving article along a path parallel to and slightly above the plane of balanced forces until such article is discharged into the bin.

16. A method as in claim 10, wherein the decelerating step comprises:

decelerating the moving article with a brush having a vertical bar and a row of resilient bristles extending therefrom toward the first end of the bin.

17. A method as in claim 10 or 13, wherein the decelerating step comprises:

forming the elements of a non-magnetic material, free of sharp edges such that a body slidably restrained along the elements is not damaged therealong.

* * * * *